United States Patent
Goldberg

(10) Patent No.: US 9,983,961 B2
(45) Date of Patent: *May 29, 2018

(54) OFFLINE INITIALIZATION FOR A REMOTE MIRROR STORAGE FACILITY

(75) Inventor: Itzhack Goldberg, Mount Carmel (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

This patent is subject to a terminal disclaimer.

(21) Appl. No.: 13/535,621

(22) Filed: Jun. 28, 2012

(65) Prior Publication Data
US 2013/0191337 A1 Jul. 25, 2013
US 2017/0329681 A9 Nov. 16, 2017

Related U.S. Application Data

(63) Continuation of application No. 13/355,773, filed on Jan. 23, 2012.

(51) Int. Cl.
G06F 13/00 (2006.01)
G06F 11/20 (2006.01)

(52) U.S. Cl.
CPC ................ *G06F 11/2082* (2013.01)

(58) Field of Classification Search
CPC .......... G06F 11/20; G06F 12/20; G06F 12/02; G06F 17/00; G06F 17/30
See application file for complete search history.

(56) References Cited

U.S. PATENT DOCUMENTS

| | | |
|---|---|---|
| 6,237,008 B1 | 5/2001 | Beal et al. |
| 6,691,245 B1 | 2/2004 | Dekonig |
| 8,055,614 B1 * | 11/2011 | Vaikar .................. G06F 11/1448 707/610 |
| 8,108,634 B1 * | 1/2012 | Natanzon et al. ............. 711/162 |
| 8,335,771 B1 * | 12/2012 | Natanzon .......... G06F 17/30008 707/684 |
| 2003/0126107 A1 * | 7/2003 | Yamagami .......... G06F 11/1456 |
| 2003/0131278 A1 * | 7/2003 | Fujibayashi ........ G06F 11/1469 714/6.3 |
| 2003/0229645 A1 | 12/2003 | Mogi |
| 2005/0149481 A1 | 7/2005 | Hesselink et al. |
| 2006/0036904 A1 | 2/2006 | Yang |
| 2007/0022144 A1 | 1/2007 | Chen |
| 2007/0168518 A1 | 7/2007 | McCabe et al. |

(Continued)

FOREIGN PATENT DOCUMENTS

| | | |
|---|---|---|
| CN | 102497428 A | 6/2012 |
| EP | 1933236 A1 | 6/2008 |
| WO | WO3017022 A2 | 2/2003 |

OTHER PUBLICATIONS

Dusfrane et al., "IBM XIV Storage Instructions—Copy service and migration", 2011.

*Primary Examiner* — Charles Rones
*Assistant Examiner* — Han Doan
(74) *Attorney, Agent, or Firm* — Griffiths & Seaton PLLC

(57) ABSTRACT

An initial remote region of a first remote storage device of a remote storage system not matching a corresponding local region of a local storage device of a remote local system is detected. A subsequent remote region on the remote storage system matching the initial remote region is identified. Data in the initial remote region is replaced with data from the subsequent remote region.

8 Claims, 3 Drawing Sheets

(56) References Cited

U.S. PATENT DOCUMENTS

| | | | |
|---|---|---|---|
| 2008/0021936 A1* | 1/2008 | Reynolds | G06F 21/64 |
| 2008/0235445 A1 | 9/2008 | Kacin et al. | |
| 2009/0177710 A1 | 7/2009 | Holenstein et al. | |
| 2009/0259817 A1* | 10/2009 | Sharma et al. | 711/162 |
| 2011/0099331 A1 | 4/2011 | Kito | |
| 2011/0188651 A1 | 8/2011 | Iswandhi et al. | |

* cited by examiner

OFFLINE INITIALIZATION FOR A REMOTE MIRROR STORAGE FACILITY

CROSS-REFERENCE TO RELATED APPLICATIONS

The present application is a Continuation of U.S. patent application Ser. No. 13/355,773, filed Jan. 23, 2012.

FIELD OF THE INVENTION

The present invention relates generally to data storage, and specifically to the initialization and synchronization of a remote data storage device for asynchronous or synchronous mirroring.

BACKGROUND OF THE INVENTION

In computing, virtualization is defined as the creation of a virtual (rather than an actual) version of an entity such as an operating system, a server, a storage device or a network resource. Virtualization technology makes it possible to run multiple virtual "machines" on a single physical computer system, where each virtual machine executes its own instance of an operating system. Multiple virtual machines running on the same physical computer system typically require the ability to share input/output (I/O) devices such as storage devices (e.g., disk drives) and network adapters.

When concurrently executing multiple instances of an operating system via virtualization, a computer system typically virtualizes its physical storage devices. By implementing storage virtualization, each operating system instance accesses a corresponding unique instance of a virtual storage device, where all the virtual storage devices are sharing the same physical storage devices.

SUMMARY OF THE INVENTION

There is provided, in accordance with an embodiment of the present invention a method, including detecting an initial remote region of a first remote storage device of a remote storage system not matching a corresponding local region of a local storage device of a remote local system, identifying a subsequent remote region on the remote storage system matching the initial remote region, and replacing data in the initial remote region with data from the subsequent remote region.

BRIEF DESCRIPTION OF THE DRAWINGS

The disclosure is herein described, by way of example only, with reference to the accompanying drawings, wherein.

DETAILED DESCRIPTION OF EMBODIMENTS

Overview

Figure 1:
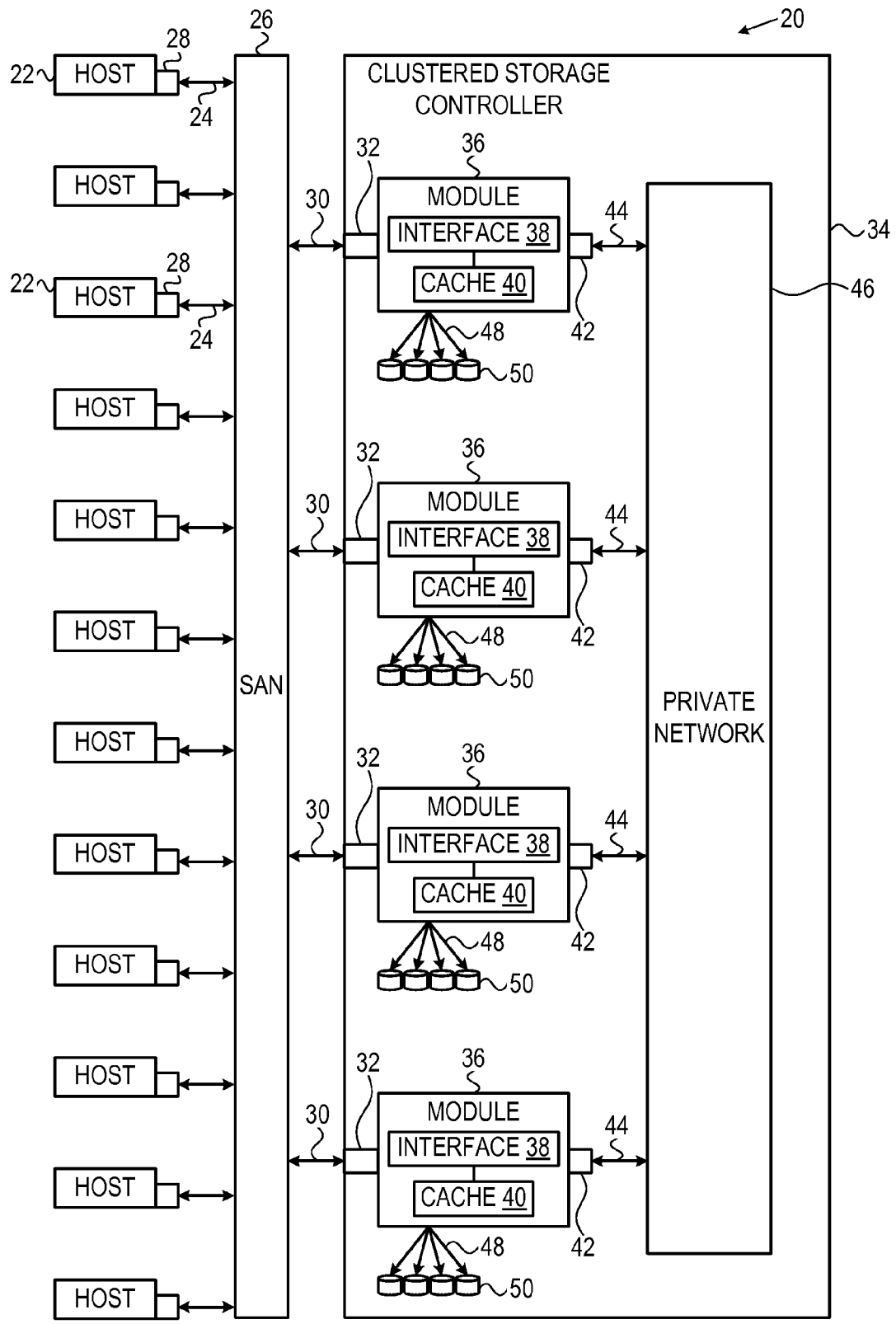
FIG. 1 is a schematic pictorial illustration of a storage system, in accordance with an embodiment of the present invention.

Mirroring replicates a local data storage device to a separate remote data storage device, in order to ensure redundancy. For a storage facility comprising the local and remote storage devices, mirroring can be implemented either synchronously or asynchronously. During synchronous mirroring, a host (e.g., a database server) communicating with the storage facility receives a write acknowledgement after data is successfully written to both the local and the remote storage devices. Synchronous mirroring is typically implemented over a high speed local area network (LAN) or a wide area network (WAN).

During asynchronous mirroring, the host receives the write acknowledgement after the data is written to the local storage device (i.e., the remote storage device may have not yet received the data and/or may not have acknowledged writing the data). Asynchronous mirroring is typically implemented over lower speed wide area networks, especially over greater distances.

To initialize the mirroring (i.e., either asynchronous or synchronous), data in the local storage and the remote devices are typically synchronized (i.e., the data must be consistent). Additionally or alternatively the synchronization can be performed any time it is detected that the local and the remote storage devices are not synchronized (i.e., storing the same data).

Embodiments of the present invention provide methods and systems for synchronizing the local and remote storage devices, thereby accommodating any differences in data stored on the devices. In the following description, the local and the remote storage devices are assumed to function respectively in local and remote storage systems (e.g., clustered storage controllers) of the storage facility.

During the initialization, the remote regions of the remote storage device may be loaded with data from the local regions of the local storage device. Typically the local storage device comprises a plurality of local regions, and the remote storage device comprises a plurality of remote regions with a one-to-one correspondence with the local regions.

In some embodiments, data from local regions (a region is a sequence of bytes having a specific length, typically one megabyte) from the local storage device are stored to a removable medium (e.g., magnetic tape). The removable medium is then physically transferred to the remote storage system site (also referred to as the remote site), and the data is loaded to remote regions on the remote storage device. The local region data copied from the removable medium is a reference that can be used as baseline during the synchronization.

In an alternative embodiment, prior to physically transporting the storage system to the remote site, the remote storage system is coupled to the local storage system via a local area network, and data from the local regions of the local storage device is transferred (i.e., via the network) to the remote regions of the remote storage device.

In a further embodiment, the remote regions of the storage device are not initialized with any data prior to the synchronization, and the synchronization (described in detail hereinbelow) loads data to all the remote regions.

After the remote storage system is initialized and positioned at the remote site, the remote regions are updated with data from any local regions whose data was updated after the initialization. As explained in detail hereinbelow, an initial remote region is detected that does not match its corresponding local region, a subsequent remote region is identified on the remote storage system that matches the first remote region, and data in the initial remote region is replaced with data from the subsequent remote region.

In some embodiments, the local storage system calculates local signatures (e.g., checksums) over local regions of the local storage device. The local storage system conveys the local signatures to the remote storage system via a data communication channel. In some embodiments, upon receiving the local signatures, the remote storage system calculates corresponding remote signatures over remote regions of the remote storage device. In alternative embodiments the local and the remote storage systems calculate the local and the remote signatures concurrently.

Each of the local signatures is associated with a given local region, and each of the remote signatures is associated with a given remote region. Additionally, each of the local signatures has a corresponding remote signature.

If the remote storage system identifies an initial remote signature not matching its corresponding local signature, then the remote storage system first searches for a subsequent remote signature that matches the initial remote signature. If the remote storage system detects a subsequent remote signature that matches the initial remote signature, then data stored in a subsequent remote region associated with the subsequent remote signature is identical to data stored in an initial remote region associated with the initial remote signature, and the remote storage system replaces the non-current data in the initial remote region associated with the initial remote signature with the current data from the subsequent remote region associated with the subsequent remote signature.

If the remote storage system does not detect a subsequent remote signature that matches the initial remote signature, then the remote system informs the local storage system. The local storage system conveys the data of the corresponding local region, i.e., the current data, to the remote storage system, which then replaces the non-current data in the initial remote region with the current data.

For a computer system implementing storage virtualization, there may be many identical regions on the system's storage device(s). For example, the computer system may be executing multiple instances of an operating system (typically via operating system virtualization), with each instance reading and writing to different regions (i.e., volumes) on the storage device(s). Due to the multiple identical regions discussed supra, if an initial remote signature does not match its corresponding local signature, there may be a subsequent remote signature that matches the initial remote signature. Therefore, embodiments of the present invention provide an efficient method of synchronizing local and remote storage devices, since the initial remote region (stored on a first given remote storage device) can be updated with data copied locally from the subsequent remote region (stored on either the first given remote storage device or a second given remote storage device), instead of being updated with data from the corresponding local region that is conveyed via a wide area network.

System Description

FIG. 1 is a schematic pictorial illustration of a data processing storage subsystem 20, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1000 through 1019 of a logical volume. Storage subsystem 20 typically operates in, or as, a network attached storage (NAS) or a SAN system.

Storage subsystem 20 comprises a clustered storage controller 34 coupled between SAN 26 and a private network 46 using data connections 30 and 44, respectively, and incorporating adapters 32 and 42, again respectively. Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 is typically, but not necessarily approximately equal in size and is assumed to be coupled, by way of example, in a one-to-one correspondence with a set of physical storage devices 50, which are typically disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. Typically, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Routing records, indicating the association of logical addresses of logical volumes with partitions and the association of the partitions with the caches, are distributed by SAN 26 to one or more generally similar network interfaces 38 of storage modules 36. It will be understood that storage subsystem 20, and thus clustered storage controller 34, may comprise any convenient number of network interfaces 38. Subsequent to the formation of storage devices 50, network interfaces 38 may receive I/O commands from host computers 22 specifying logical addresses of storage devices 50. The network interfaces use the routing records to break the commands into I/O instructions, or command subsets, that are then distributed among caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 is typically performed over a network and/or a switch. Herein, by way of example, HBAs 28 may be coupled to storage modules 36 by at least one switch (not shown) of SAN 26, which can be of any known type having a digital cross-connect function. Additionally or alternatively, HBAs 28 may be directly coupled to storage modules 36.

Data having contiguous logical addresses are generally distributed among storage devices 50. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
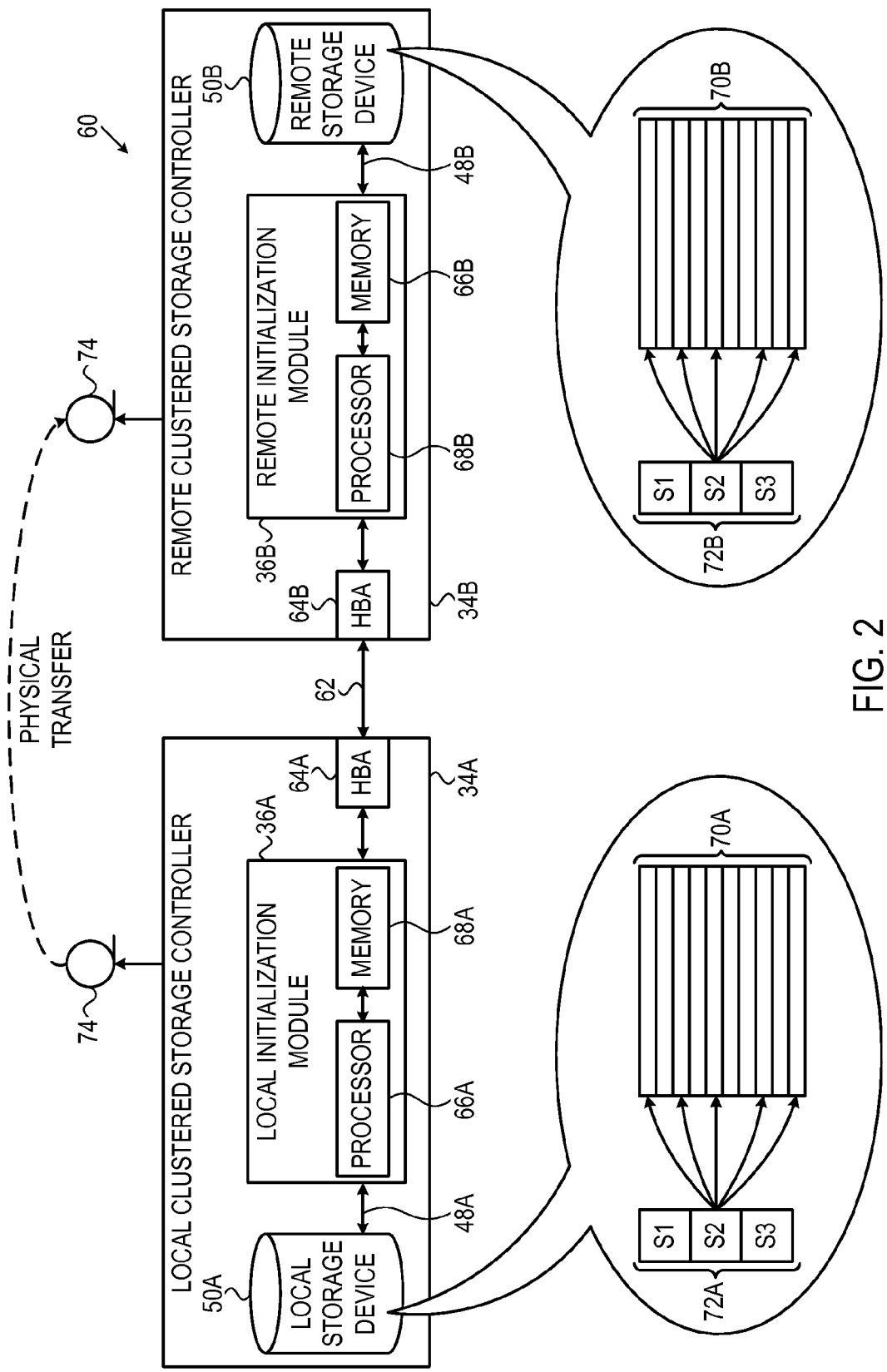
FIG. 2 is a schematic pictorial illustration of a remote mirror initialization and synchronization facility, in accordance with an embodiment of the present invention.

FIG. 2 is a schematic pictorial illustration of a remote mirror initialization and synchronization facility 60, in accordance with a disclosed embodiment of the present invention. In the description herein, clustered storage controllers 34 and their respective components may be differentiated by appending a letter to the identifying numeral, so that clustered storage controllers 34 comprise a local clustered storage controller 34A and a remote storage controller 34B.

Facility 60 comprises local clustered storage controller 34A having a local storage device 50A which is to be mirrored to remote storage device 50B of remote clustered storage controller 34B. The mirroring, as well as other communication between the local and the remote clustered storage controllers, is performed over a wide area network (WAN) 62 via HBAs 64A and 64B in the two clustered storage controllers. While the example shown in FIG. 2 shows facility 60 comprising the local and the remote clustered storage controllers, other types of storage systems are considered to be within the spirit and scope of the present invention.

Local clustered storage controller 34A comprises local module 36A, local storage device 50A and local HBA 64A. Local module 36A comprises a processor 66A and a memory 68A. Local storage device 50A stores data in a plurality of local regions 70A. In addition to local regions 70A, storage device 50A may store local signatures 72A, where each given region 70A has a corresponding signature 72A. Typically, a given signature 72A is appended to its corresponding region 70A on storage device 50A.

Remote clustered storage controller 34B comprises remote module 36B, remote storage device 50B and remote HBA 64B. Remote module 36B comprises a processor 66B and a memory 68B. Remote storage device 50B stores data in a plurality of remote regions 70B. In addition to regions 70B, storage device 50B may store remote signatures 72B, where each given region 70B has a corresponding signature 72B. Typically, a given signature 72B is appended to its corresponding region 70B on storage device 50B.

The local and remote signatures (also called a data integrity field or DIF) are commonly added to a given region (also referred to as a block or a segment) of data in order to protect against data errors, particularly (but not exclusively) in data storage applications. The signatures typically comprise a checksum calculation performed on data in a given region. One example checksum calculation is the Message-Digest algorithm 5 (MD5), which is a cryptographic hash function with a 128-bit hash value. Checksum calculations, such as MD5 are not collision resistant (i.e., for two regions a and b, there may be instances where a hash function H yields $H(a)=H(b)$). For example, a 64 terabyte (TB) storage device with 64 kilobyte (KB) regions has $10^9$ regions in the device. Since the MD5 has a 128 bit hash value, the probability of a false negative is $2^{128}$. Therefore the chance of a collision in the 64 TB storage device is $(2^{28}/2^{128})$ or 1 in $2^{100}$.

Local clustered storage controller 34A is operative to store data to a removable medium 74 which can be physically transported from the site of the local storage controller to the site of the remote storage controller. Remote clustered storage controller 34B is operative to load data from removable medium 74.

Storage devices 50A and 50B typically comprise a combination of high capacity hard disk drives and solid state disk drives. In some embodiments each of the storage devices may comprise a logical disk. In storage systems implementing the Small Computer System Interface (SCSI) protocol, the logical disks are typically referred to as logical units, or LUNs. While each LUN is typically addressed as a single logical unit, the LUN typically comprises a combination of high capacity hard disk drives and/or solid state disk drives.

Processors 66A and 66B typically comprise general-purpose computers, which are programmed in software to carry out the functions described herein. The software may be downloaded to local module 36A and remote module 36B in electronic form, over a network, for example, or it may be provided on non-transitory tangible media, such as optical, magnetic or electronic memory media. Alternatively, some or all of the functions of processors 66A and 66B may be carried out by dedicated or programmable digital hardware components, or using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Remote Region Synchronization

Figure 3:
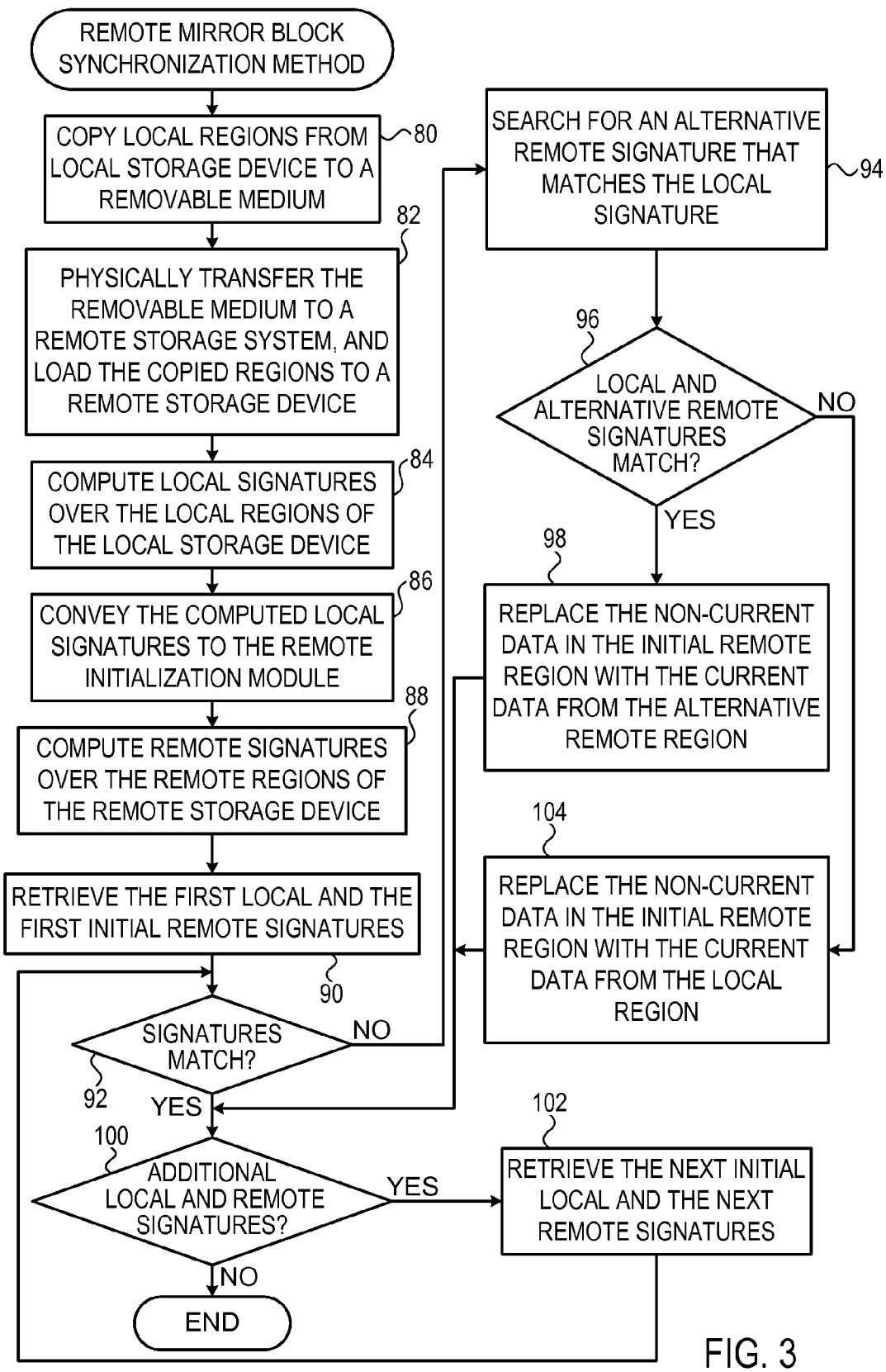
FIG. 3 is a flow diagram that schematically illustrates a local and remote region synchronization method, in accordance with an embodiment of the present invention.

FIG. 3 is a flow diagram that schematically illustrates a local and remote region synchronization method, in accordance with a first embodiment of the present invention. In an initial step 80, processor 66A copies data from local regions 70A to removable medium 74. The local region data copied to the removable medium is a record of the local storage device that facility 60 uses as a baseline during the synchronization. In a data transfer step 82, the removable medium is physically transferred to the remote site, where processor 66B loads the local region data from the removable medium to remote regions 70B. The physical transfer of the removable medium may be by any convenient method for physical transportation of the media, such as by hand and/or by a vehicle.

After verifying that the local region data was loaded correctly, processor 66B transmits a notification of correct data transfer to local module 36A via channel 62. The notification confirms that the remote regions stored on the remote storage device respectively correspond with the local regions on the local storage device at the time of initial step 80. Additionally, the local and the remote storage devices have a one-to-one correspondence of local and remote regions, respectively.

While steps 80 and 82 describe a method of initializing remote regions 70B, other initialization methods are within the spirit and scope of the present invention. In an alternative initialization embodiment, remote clustered storage controller 34B can be positioned in proximity to local clustered storage controller 34A, and the local and the remote clustered storage controllers can be coupled via a local area network (LAN). To initialize the remote regions, local processor 66A can convey data from local regions 70A to remote storage controller 34B via the LAN. After remote processor 66B saves the conveyed data to remote regions 70B, the remote storage controller can be physically transported to the remote site.

In a first signature computation step 84, upon receiving the notification, processor 66A computes local signatures 72A over local regions 70A, and stores the local signatures to memory 68A. After completing step 84, each of the local signatures is associated to a given one of local regions 70A. Calculating the local signatures enables facility 60 to detect any updates to local storage device 50A subsequent to initial step 80. If there were any updates to local storage device 50A subsequent to initial step 80, then the contents of the local and the remote storage devices are different upon completion of data transfer step 82.

In a transfer signature step 86, processor 66A conveys the local signatures from memory 68A to remote module 36B via channel 62. Upon receiving the local signatures, processor 66B stores the local signatures to memory 68B. In a second signature calculation step 88, processor 66B computes respective remote signatures 72B over remote regions 70B on remote storage device 50B, and stores the remote signatures to memory 68B. Each of the remote signatures is associated with a given one of remote regions 70B, and corresponds to one of the local signatures.

In an initial retrieval step 90, processor 66B retrieves the first local and the corresponding first remote signatures from memory 68B. In embodiments described herein, remote signatures retrieved from memory 68B are referred to as initial remote signatures. Remote processor 66B then compares the retrieved local and initial remote signatures in a first comparison step 92. If processor 66B detects that the compared signatures do not match, then in a search step 94, remote processor 66B searches memory 68B for a subsequent remote signature 72B that matches the retrieved local signature. If processor 66B identifies a subsequent remote signature 72B that matches the retrieved local signature in a second comparison step 96, then in a first update step 98, processor 66B replaces the non-current data in a initial remote region 70B associated with the initial remote signature with the current data from a subsequent remote region 70B associated with the subsequent remote signature.

Remote clustered storage controller 34B may comprise multiple logical storage devices 50B (e.g., LUNs) storing identical regions 70B. In embodiments implementing using operating system virtualization, remote processor 66B may execute multiple instances of an (identical) operating system, where each operating system accesses virtualized storage on different logical storage devices 50B. To speed up search step 94, remote processor 66B may only search a target subset of remote regions 70B for the initial remote region whose signature 72B matches signature 70A of the local region corresponding to the initial remote region.

For example, remote clustered storage controller 34B may comprise five logical remote storage devices 50B, where each of the remote storage devices comprises 10,000 remote regions. If, in search step 94, remote processor 66B is searching for a secondary remote region 70B whose signature matches local signature 72A corresponding to remote region 70B number 1,000 on the first remote logical storage device, then the remote processor can search the remote regions in proximity to remote region 70B number 1,000 of the other four remote logical storage devices. For example, remote storage processor 66B can search remote regions 70B numbered 995-1,005 for each of the other four remote storage devices 50. In other words, to expedite the search, the remote processor searches 44 remote regions 70B (i.e., 11 for each of the other four remote storage devices 50) instead of searching the 40,000 remote regions 72B of the other four remote storage devices 50).

Additionally, if remote processor 66B locates a secondary remote region 70B whose signature 72B matches local signature 70B, the remote processor can initiate subsequent searches based on the location of the secondary remote region. For example, storage devices 50 comprise five logical storage devices, and remote processor 66B updates the initial remote region number 500 on the second logical storage device with the subsequent remote region 500 on the fourth logical storage device. If signature 72B for initial remote region number 501 does not match local signature 72A for corresponding local region 70B (step 92), then in step 94, remote processor 66B can start the search for subsequent remote region 70B with remote region 501 on the fourth logical storage device 50B.

In a third comparison step 100, if there are additional local and initial remote signatures in memory 68B, then processor 68B retrieves the next local and initial remote signatures from memory 68B in a second retrieval step 102, and the method continues with step 90.

Returning to step 96, if processor 66B does not detect a subsequent remote signature 72B that matches the retrieved local signature, then in a second update step 104, processor 66B conveys a data transfer request to local module 36A over channel 62. The request includes a parameter indicating the given local region associated with the retrieved local signature. In response to the request, processor 66A conveys data from the requested given local region to remote module 36B over channel 62. On receipt of the requested local region data, processor 66A replaces the non-current data in the initial remote region with the current data from the received local region, and the method continues with step 100.

Returning to step 92, if the retrieved local and initial remote signature match, then the method continues with step 100. In step 100, the method ends when there are no additional local and initial remote signatures in remote memory 68B. In other words, the process of the flow diagram stops when data stored in remote regions 70B matches data stored on local regions 70A.

While the steps described supra detail a method of identifying local regions that were updated subsequent to initializing the remote regions (i.e., steps 80 and 82), other identification methods are within the spirit and scope of the present invention. In an alternative identification embodiment, local processor 66A stores a list (not shown) of local regions 70A that were updated subsequent to initializing remote regions 70B. Local processor 66A can convey the list to remote processor 66B, thereby indicating remote regions 70B that need to be updated.

In a further identification embodiment, remote processor 66B can compute each remote signature 72A over a given remote region 70A individually and convey a request to local processor 66A to compute a local signature 72B for a corresponding local region 70A. In response, processor 66A computes the requested local signature 72A, and conveys the computed local signature to remote processor 66B. Upon receiving the computer local signature, processor 66B can compare the computed local and the computed remote signatures.

As described supra, there may be instances where the initialization of remote regions 70A (i.e., step 80) is skipped. If no initialization is performed, the processor 68B synchronizes all regions 70B using the steps 84-102 described in the flow diagram.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method performed by a processor, comprising:
   detecting an initial remote region of a first remote storage device of a remote storage system not matching a corresponding local region of a local storage device of a local storage system, the initial remote region and the corresponding local region each comprising a sequence of bytes of a specific length of one megabyte; wherein the remote storage system is physically separated from, yet in communication with the local storage system via a wide area network (WAN) and includes a plurality of remote storage devices each including remote regions having a one-to-one correspondence with local regions of the local storage device;
   identifying a subsequent remote region comprising an additional sequence of bytes of the specific length of one megabyte included in one of the remote storage devices of the plurality of remote storage devices of the remote storage system matching the initial remote region by searching a target subset within a predefined logical proximity of each of the remote regions; and
   replacing data in the initial remote region with data from the identified subsequent remote region, thereby accommodating any differences in data stored in the local regions of the local storage system on the corresponding remote regions of the remote storage system to keep the data consistent.

2. The method according to claim 1, and comprising initializing the remote regions with data from the corresponding local regions prior to the step of detecting.

3. The method according to claim 1, wherein detecting the initial remote region not matching the local region comprises the local storage computing a local signature over the local region, and conveying the local signature to the remote storage system upon identifying the local region being updated subsequent to initializing the remote regions.

4. The method according to claim 1, wherein detecting the initial remote region not matching the local region comprises the local storage system computing a local signature over the local region, conveying the local signature to the remote storage system, the remote storage system computing an initial remote signature over the initial remote region, and detecting that the local signature and the initial remote signature do not match.

5. The method according to claim 1, wherein identifying the subsequent region comprises computing an initial remote signature over the initial remote region, computing a subsequent remote signature over the subsequent remote region, and detecting that the initial remote signature and the subsequent remote signature do not match.

6. The method according to claim 1, wherein the subsequent region is located on a storage device selected from a list consisting of the first remote storage device and a second remote storage device.

7. The method according to claim 1, and comprising replacing data in the given remote region with data from the corresponding local region, upon identifying the subsequent remote region not matching the initial remote region.

8. The method according to claim 7, and comprising prior to replacing the data in the given remote region with the data from the corresponding local region, conveying, by the remote storage system to the local storage system, a request indicating the corresponding local region, and conveying, by the local storage system to the remote storage system, the data from corresponding local region.

* * * * *